INVENTOR
Rudy VIT

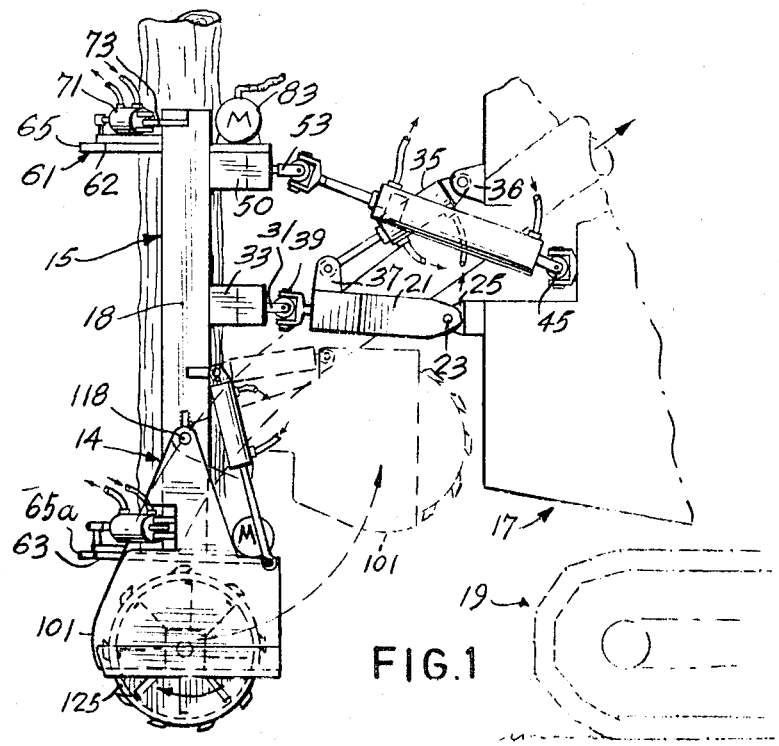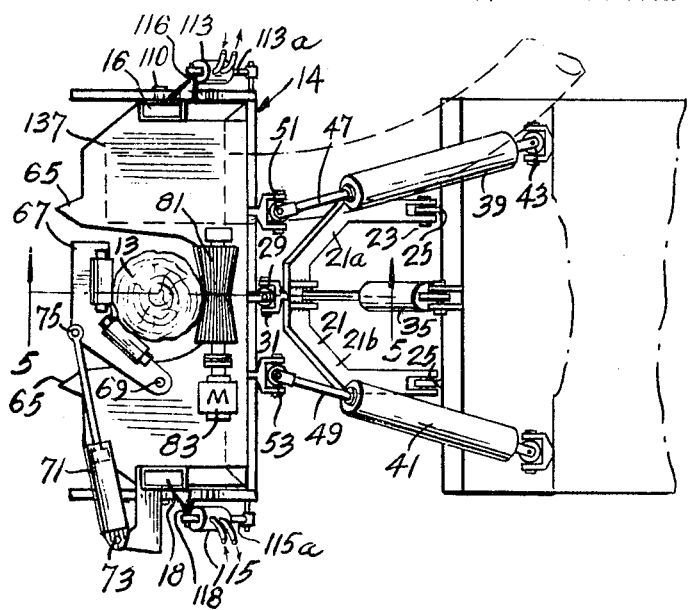

ATTORNEY

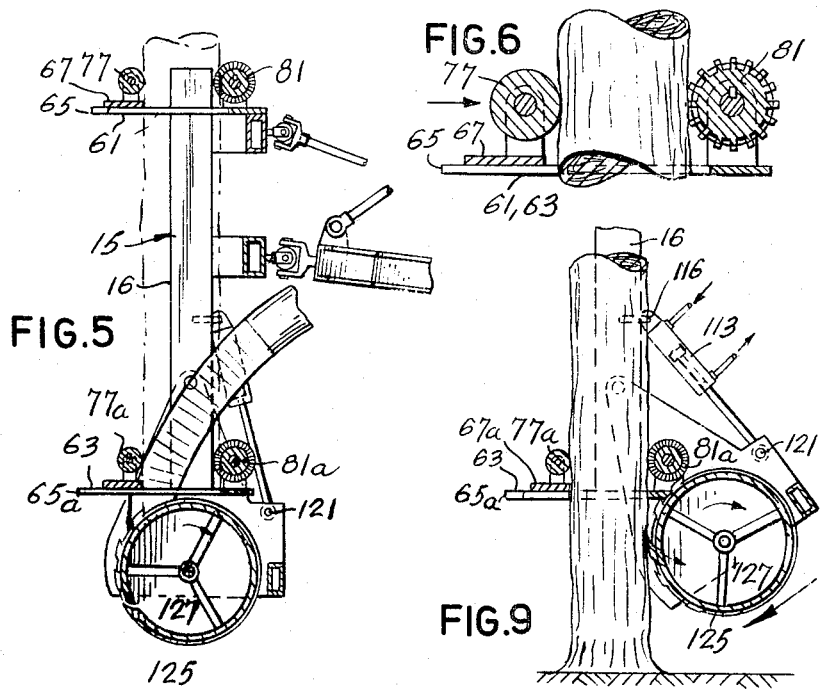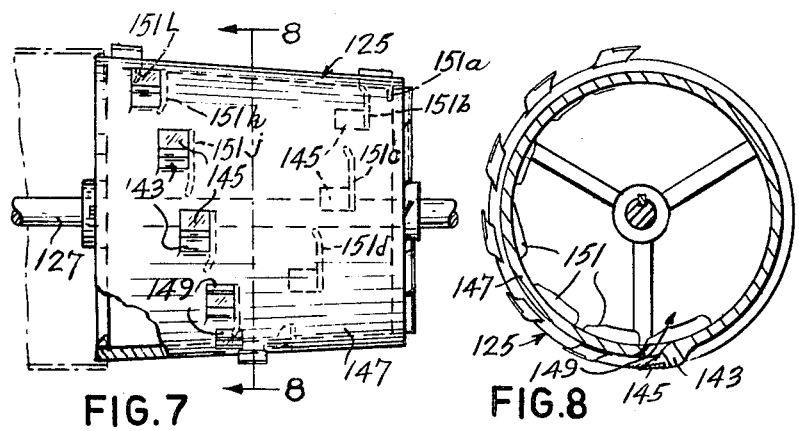

United States Patent Office 3,394,744
Patented July 30, 1968

3,394,744
METHOD AND APPARATUS FOR FELLING
AND TREATMENT OF TREES TO PRODUCE
WOOD CHIPS
Rudy Vit, 34 Ramsay St., Baie Comeau, Quebec, Canada
Filed Mar. 2, 1965, Ser. No. 436,434
Claims priority, application Canada, Feb. 27, 1965,
924,353
16 Claims. (Cl. 144—326)

ABSTRACT OF THE DISCLOSURE

Mobile apparatus, method and chipping drum for reducing in the field timber to chips, whereby the chips produced can be efficiently transported from the field where they are produced with maximum efficiency, reduced cost and with maximum utilization of the timber being cut and chipped.

---

This invention relates to the felling and treatment of trees to produce wood chips.

Reducing trees into wood chips is a standard initial operation in converting trees into wood pulp. When trees are referred to in the context of the application, it will be understood that they are the size normal to pulp wood operation. At present, it is common practice to first fell the trees, de-limb them, cut them into predetermined lengths. These cut logs are loaded into trucks or otherwise floated down a river for transporting them to a mill where the logs are finally made into chips suitable for subsequent pulp making processes. These conventional methods require considerable labor and machines. This and other conventional processes for making trees for pulp manufacture have proved in most cases to be expensive and time consuming.

The apparatus of the present invention in order to drastically reduce the handling and transportation problems, aims to provide a mobile unit capable of felling and treating trees in the field in a continuous operation so as to produce wood chips on the spot which are suitable for subsequent pulp operations. Accordingly, the method and apparatus of the invention can be used in effect to reduce trees to chips in the field whereby there is no need of transportation and handling in the form of cut logs. In the wood chip form, they obviously can be transported to any desirable site for subsequent treatment.

More specifically, the apparatus is designed in the form of a mobile versatile unit which includes the mechanical means for grasping a standing tree, severing it and reducing it to chips in a continuous operation. Means are also embodied whereby the chips produced can be regulated as to size and shape as to requirement.

Essentially the apparatus of the present invention comprises a chipping assembly articulated to a suitable vehicle. The chipping assembly includes a primary frame including transversely disposed tree clamping means in spaced relation thereto capable of grasping a standing tree and holding it for the subsequent operations. The working rotary chipping head is mounted on a secondary frame which in turn is pivotally mounted to the end of the primary frame below the clamping means. The rotary chipping head is arranged relative to the primary frame to engage and gradually eat or chip its way into the tree so that it is severed at the desired height above the ground. Feeding means are provided on the primary frame for sequentially feeding the tree, after it has been severed, downwards through the clamping means and along the axis of the primary frame towards the rotary chipping means so that the chipping process is substantially continuous until the tree tapers off or breaks at a point where there is not sufficient thickness. Preferably, means are also provided to receive and deliver the wood chips so formed to a suitable transport medium.

Having thus described the invention, it will be referred to in more detail by reference to the accompanying drawings illustrating a preferred embodiment of the invention, and in which:

FIGURE 1 is a side elevation view showing a preferred form of the apparatus of the invention in a working operative position;

FIGURE 2 is a view of the apparatus as shown in FIGURE 1 as shown in top plan;

FIGURE 5 is a vertical cross-section taken along line 5—5 of FIGURE 2;

FIGURE 6 is a partial vertical cross-section taken along line 6—6 of FIGURE 2;

FIGURE 7 is an enlarged view in front elevation of the rotary chipping head;

FIGURE 8 is a vertical cross-section taken along line 8—8 of FIGURE 7 to illustrate the general construction of the chipping head; and FIGURE 9 is a somewhat diagrammatic view showing the rotary cutting head in a partial cross-section to illustrate its relative position at the initial contact with the tree.

Figure 3:
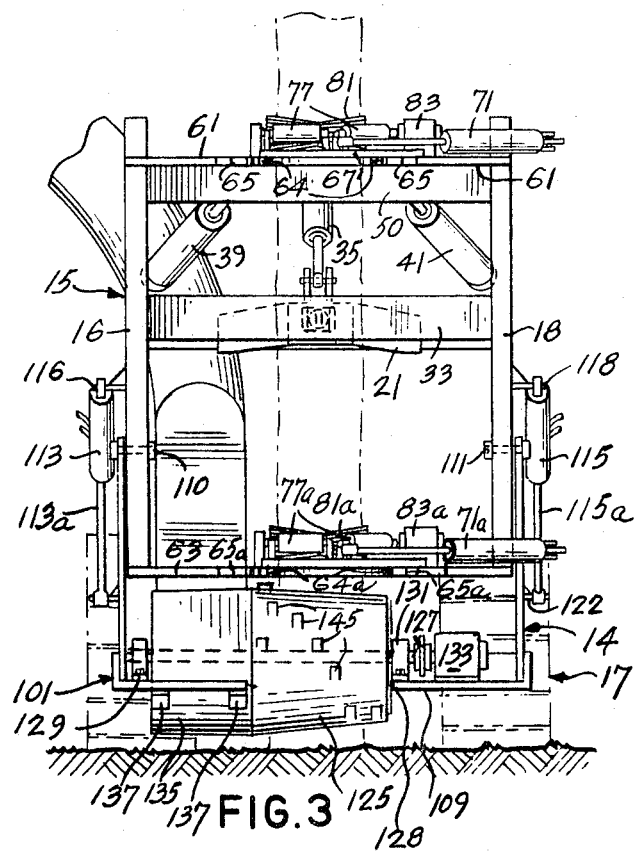
FIGURE 3 is a front elevation of the tree chipping unit of the invention in an operative position.

As shown more clearly in FIGURES 1 to 5, the main elements of the present apparatus comprise a chipping assembly 14 mounted on the front of a mobile unit such as a vehicle 17 having wheels or, as illustrated in the drawing, tracks 19.

The chipping assembly 14 includes a primary rectangular frame 15 mounted to the vehicle 17 by means of a hinged triangular supporting frame 21. The frame 21 is mounted for vertically pivotal motion to the tractor 17 by pivot pins fixed in mounting brackets 25 which are secured to the frame of the vehicle 17. The connecting end of supporting frame 21 is provided with arms $21_a$ and $21_b$ which are bored and in which bushings 27 are provided for pivotal cooperation with the pivot pins 23.

Bracket 36 is mounted on the frame of the tractor 17 and bracket 37 is mounted on supporting frame 21. A hydraulic cylinder 35 is connected at one end to the bracket 36 on the tractor 17 and at the other end by means of a piston rod extending from the cylinder 35, it is connected to the bracket 37. When activated, the piston rod of cylinder 35 will lift or lower the supporting frame 21. Cylinder 35 is controlled by a lever in a control booth (not shown) on the vehicle 17. Fluid is delivered to the cylinder 35 by means of the lever in the control booth from a pump on a tractor which is also not shown.

The primary frame 15 is connected to and articulated to the supporting frame 21 by means of a universal ball joint 31 which is fixed to a cross member 33 of the frame 15. This universal joint 31 permits the frame to articulate in any direction relative to the supporting frame 21.

Furthermore, brackets 43 and 45 are provided near each side of the tractor frame as shown in FIGURE 2. Mounted on a cross member 50 which is in turn mounted on the frame 15 are brackets 51 and 53. The cylinder 39 is connected universally at one end to bracket 43 and at the other end its piston rod 47 is connected universally to the bracket 51 on the cross memebr 50. Similarly, cylinder 41 is universally connected to the bracket 45 on the tractor frame and at the other end it is connected by means of piston rod 49 to the bracket 53. Actuation of the cylinders 39 and 41 by means of levers in the control booth, previously mentioned, will control the movement of the frame 15 relative to the supporting frame 21 and the tractor 17.

The primary frame 15 comprises basically of two rectangular hollow steel members 16 and 18 inter-spaced by horizontally extending platforms 61 and 63 at the top and bottom of the frame 15 respectively. Cross member 50 is mounted immediately below the platform 61 and is preferably welded to the hollow frame members 16 and 18. Cross member 50 supports the platform 61 and, as previously described, mounts the brackets 51 and 53.

The cross memebr 33 is suitably spaced below the cross member 50 and mounts the previously described universal ball joint 31 which provides the articulation point for the primary frame 15.

Platforms 61 and 63 extend forwardly of the frame 15 on the side opposite the tractor. Platform 61 comprises generally a rectangular steel plate 62 having a central cutout portion 64 provided to receive the tree 13. On each forward corner of the plate 62 defining the cut-out port 64, short extensions 65 project outwardly providing guides for easing the chipping assembly 14 about the tree 13.

The curved arm 67 is pivotally mounted in a plane parallel to the plate 62 by means of pivot pin 69 fixed to plate 62. It is adapted to slide over the cut-out portion 64 in order to reduce the area of the cut-out portion thereof. The cylinder 71 is pivoted to a bracket 73 mounted on the platform 61 at one end thereof and to a point on the curved arm 67 at the piston rod end. Actuation of the cylinders 71 moves the curved arm 67. The inner portion of the curved portion 67 which is adapted to contact the tree 13 is provided with idler rollers 77 and 79 to reduce friction. The portion of plate 62 which is adapted to contact the tree 13 is provided with a roller 81 which can be driven as shown in FIGURE 2 by a hydraulic motor 83 or alternatively it can rotate freely.

Platform 63 is identical to platform 61, and the reference numerals designating the various elements on the platform 61 have been raised by the subscript "a" and will not be described herein. However, one essential difference is that the feed roller $81_a$ of the platform 63 is the bottom roller and it is necessarily driven by a hydraulic motor $83_a$ which is provided and is controlled by a lever in the control booth (not shown) in the tractor 17.

The chipping head will now be described in more detail. A secondary frame 101 is pivoted from the main frame 15. It is provided for carrying a rotary chipping head 125. More specifically, the frame 101 comprises two side frame members 105 and 107 at each side of a platform member 109. Side frame members 105 and 107 are pivotally mounted to each side to primary frame members 16 and 18 respectively by means of pivot pins 110 and 111.

Primary frame members 16 and 18 are provided with mounting brackets 116 and 118 respectively. The side frame members 105 and 107 of the secondary frame 101 are provided with mounting brackets 121 and 122. Cylinders 113 and 115 are pivoted at one end to brackets 116 and 118 of the frame members 16 and 18 respectively and their respective piston rods are connected at the other end to mounting brackets 121 and 122 of the side frame members 105 and 107. Therefore, the pivotal movement of the secondary frame 101 can be controlled by simultaneous actuation of the cylinders 113 and 115 from the control booth.

The platform 109, preferably of a substantially rectangular configuration, supports the working parts of the chipping head. These include a cutting drum 125 having a frustro-conical shape mounted centrally of the platform 109 in a cut-out portion 126 provided therein. It comprises a frustro-conical outer wall 147 having a smaller end being closed and a larger end being open. Curved vanes 128 are mounted in spaced relationship on the enclosed end of the drum for the purpose of creating an air flow outwardly of the drum 125. The cutting drum 125 is mounted on and is keyed to a shaft 127. Bearings 131 and 129 are mounted on platform 109 in a spaced relationship on each side of the cut-out portion 126. The shaft 127 is journalled at one end to the bearing 131 and at the other end to bearing 129. A hydraulic motor 133 is provided at one end of the shaft 127 for driving the shaft 127.

An enclosed cylindrical housing 135 is mounted directly to the platform 109 adjacent to the cutting drum 125 at the open end and is mounted to the platform 109 by means of brackets 137. The portion of shaft 127 extending through the larger end of the cutting drum passes through the cylindrical housing 135 and an impeller 139 is mounted on this shaft portion for rotational movement within the cylindrical housing 135.

A plurality of cutting teeth 143 (in the illustrated construction, 12 teeth are shown) are mounted about the drum 125 and are in equally circumferential relation in a spiral formation about the outer surface of the drum 125 along the axial length. With this arrangement, the teeth 143 are sequentially staggered widthwise in a manner as shown in FIGURE 7 and they overlap each other slightly so that they give an effective cutting action across the complete width of the drum 125. Cutting teeth 143 can be separated elements secured to the outer wall 148 of the drum or can be integral with the wall 148. Still further, the entire drum 125 can be made from a casting.

Each tooth is provided with an adjustable cutting bit 145 projecting forward of the tooth. By adjusting the cutting bits 145, the preferred shape and size of the wood chip produced can be regulated.

In the construction illustrated, the drum wall 148 includes a slot 149 disposed in advance of each tooth 143 for receiving wood chips which are cut by the cutting bits 145. Each of the slots 149 is provided with a vane 151 which acts as a chip deflector and an additional means of building an air current towards flexible duct 141. Each vane 151 is located on the side of each slot 149 nearest the enclosed end and each vane 151 has a different pitch; for instance, vane $151_a$ nearest the enclosed end of the drum 125 is the most acute, approximately 47° and the vane $151_L$ nearest the open end is the flattest, approximately 69°. Vanes $151_a$, $151_b$, and . . . $151_L$ interposed between these two limits vary proportionally.

A flexible duct 141 is connected to the housing 135 and receives the chips fed by the impeller 139 and the draft caused by the vanes 128 and 151. The duct 141 communicates with a suitable transport means for delivering the product chips.

*Operation*

Figure 4:
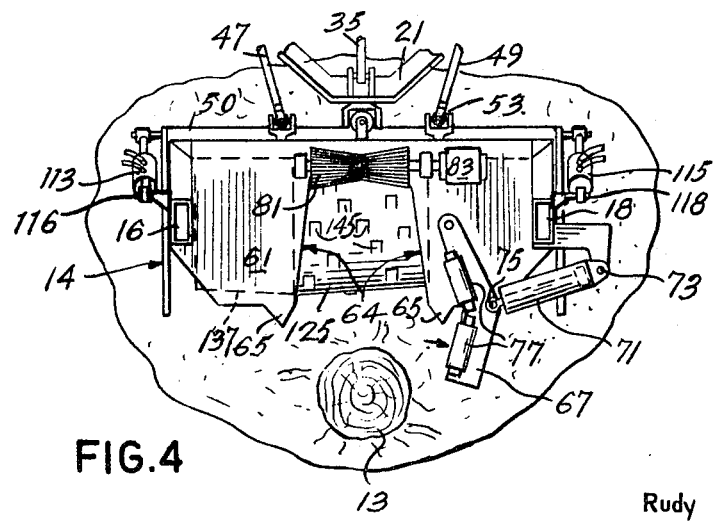
FIGURE 4 is a top plan view of the apparatus in FIGURE 1 as seen in a ready position.

In order to fell and treat chips in accordance with the method of the invention and using the apparatus prescribed, the chipping assembly 14 is moved forward by the vehicle 17 and the assembly 14 is properly aligned with the tree 13 by properly controlling the cylinders 35, 39 and 41 as shown in FIGURE 4. In this construction, the curved arms 67, $67_a$ on the platforms 61 and 63 respectively are in a retracted position as shown in FIGURE 4. Also the secondary frame 101 is in a carrying position as shown in dotted lines in FIGURE 1.

When the chipping assembly 14 is properly aligned with the tree 13, it is moved forward by the tractor 17 placing the apparatus in an operative position about the tree 13. The curved arms 67 and $67_a$ are subsequently closed about the tree 13 which is now located in the cut-out portion 64 of both platforms 61 and 63. The curved arms are actuated by the cylinders 71 and $71_a$ respectively from the control booth on the vehicle 17.

The secondary frame 101 is then lowered towards the trunk of the tree 13 and simultaneously the hydraulic motor 133 is activated, energizing the cutting drum 125. In a preferred condition, the maximum speed of the drum 125 is 2800 r.p.m. (not engaged with the tree). As the conical drum 125 comes into contact with the base of the tree 13, the cutting bits 145 begin chipping their way into the trunk of the tree and consequently the speed is reduced proportionally depending on the hardness of the tree.

As soon as the rotating drum 125 goes through the base of the tree 13, it assumes its normal operating position as shown in the drawings, particularly FIGURE 1. Hydraulic motor 83$_a$ and possibly 83 are then energized driving bottom roller 81$_a$ and possibly roller 81 which in turn feeds the tree 13 downwardly along the axis of the frame 15 towards the rotating cutting drum 125. As the chips are cut by the bits 143, they are forced into the drum 125 through the slots 149 where they are deflected by the vanes 151 towards the open end, the conical formation of the drum and the air currents created by the vanes 128 and 151 help to move the chips out into the cylindrical housing 135 where they are picked up by the impeller 137 and are forced into and through the duct 141 into suitable transport means.

As soon as the tree 13 is completely processed in the prescribed manner, the secondary frame 101 is moved into a retracted position. Also curved arms 67 and 67$_a$ are retracted placing the apparatus in a position ready to advance upon another tree.

It will be apparent that the apparatus described above can be readily used for clearing a slash in a forest. For this use, the duct 141 would simply be directed to one side. While the apparatus moves ahead, the chips coming out of the ducts 141 would merely be deposited by the side of the newly constructed slash.

I claim:

1. A tree felling and chipping apparatus adapted for use in combination with a mobile vehicle, comprising a rotary wood chipping assembly including means for grasping and holding a tree to be felled, rotary cutting means including a hollow frusto-conical drum, having means for cutting and delivering the chips, being produced, radially into the drum, adapted to sever by chipping through said tree at a predetermined height from the ground, and means for subsequently feeding said severed tree towards said cutting means for completely reducing said severed tree into chips.

2. A tree felling and chipping apparatus as claimed in claim 1 wherein said rotary chipping assembly is mounted on a supporting frame articulated for universal movement with said vehicle.

3. An apparatus for felling and treating trees in order to form wood chips including in combination a motor vehicle and a chipping head articulated at one end of said vehicle, said chipping head comprising a primary frame member having at least two transverse tree clamping means in spaced relation thereto, rotary chipping means including a hollow, rotary, frusto-conical drum having means for cutting and delivering the chips, being produced, radially into the drum, said chipping means mounted on a secondary frame member pivoted to an end of said primary frame member below said clamping means, first driving means for energizing said chipping means, first motor means for aligning said primary frame member with a standing tree, second motor means for opening and closing said clamping means for engaging said tree, third motor means for pivoting said chipping means into chipping contact with said tree whereby said tree is severed, feeding means for feeding the severed tree along the axis of said frame towards said chipping means, second driving means for energizing said feeding means, and second delivery means in cooperative association with said chipping means for removing chips from said drum.

4. An apparatus for chipping trees including in combination a motor vehicle and a chipping head articulated at one end of said vehicle, said chipping head comprising a primary frame member having at least two transverse clamping means in spaced relation thereto, rotary chipping means mounted on a secondary frame member pivoted to an end of said primary frame member below said clamping means, first hydraulic driving means mounted on said secondary frame for energizing said chipping means, first hydraulic motor means for aligning said primary frame with a standing tree, second hydraulic motor for opening and closing said clamping means for engaging said tree, third hydraulic motor for pivoting said chipping means into chipping contact with said tree whereby said tree is severed, feeding means for feeding said severed tree along the axis of said frame towards said chipping means, second hydraulic driving means mounted on said primary frame for energizing said feeding means, and delivery means in cooperative association with said chipping means for removing product chips therefrom.

5. An apparatus for chipping trees comprising in combination a vehicle and a rectangular frame in a substantially vertical plane, a connecting member connecting said vertical frame to one end of said vehicle, said connecting member being pivoted at one end about a horizontal axis to said vehicle, said frame being articulated to the other end of said connecting member by a universal joint, at least a pair of tree clamping means mounted transversely to said vertical frame in spaced relation thereto, and chipping means mounted below said clamping means for severing said tree at its base, feeding means mounted on said vertical frame and adapted to feed a clamped tree along the axis of the vertical frame in cooperation with said clamping means towards said chipping means, first motor means for pivoting said connecting member in vertical plane about said horizontal axis, second motor means for articulating said frame relative to said connecting member and said vehicle, third motor means for opening and closing said tree clamping means.

6. In an apparatus for felling and chipping trees, a rectangular frame member adapted to be articulately connected to one end of a vehicle comprising spaced-apart elongated side frame members interspaced with at least one transversal cross member and at least two transverse platform members adapted to individually mount tree clamping assemblies, a universal joint member mounted centrally of said cross member adapted for universal engagement at said articulated connection.

7. In an apparatus for chipping trees, rotary chipping means mounted for rotation on a chipping head, said chipping head being adapted to feed cut trees to said chipping means, said chipping means comprising a hydraulic means driving a shaft, a frusto-conical drum having a circumferential wall fixedly mounted to said shaft, the end of said frusto-conical drum being enclosed by a radially extending wall defining vaned passages for forcing air through teeth projecting in the direction of rotation for engagement with said tree to form chips therefrom, said circumferential wall defining openings forward of each of said teeth for passing said chips into said drum, deflecting vanes defining the upstream side of said passages adapted to deflect said chips downstream.

8. In an apparatus as defined in claim 7, a rotary chipping means, wherein said chipping teeth include adjustable cutting knives.

9. In an apparatus as defined in claim 7, a rotary chipping means wherein said vanes defining said upstream side of said chip passages varies from a substantially acute vane at the enclosed end to a substantially flat vane at the other end.

10. An apparatus as defined in claim 7, including a rotary chipping drum wherein said teeth are equi-spaced circumferentially and are staggered with wire substantially across the width of said drum.

11. An apparatus for chipping trees including in combination a motor vehicle and a chipping head articulated at one end of said vehicle, said chipping head comprising a substantially primary frame member, rotary chipping means including a hollow, rotary, frusto-conical drum having cutting teeth mounted thereon and delivery ports associated with said teeth for delivering said chips to within the drum, said chipping means mounted on a secondary frame member pivoted to the bottom end of said primary frame member, driving means for energizing said chipping means, motor means for pivoting said second frame relative to said primary frame between a retracted position and an operating position substantially aligned with said primary frame member.

12. In an apparatus for chipping trees as previously described, a chipping head comprising a primary frame member having at least two transverse tree clamping means in spaced relation thereto, said clamping means comprising a curved arm having an inner portion pivotally mounted at one end to said primary frame member, idler members mounted on said inner portion of said arm for contacting said tree, motor means for pivoting said arm between a tree contacting position and a retracted position.

13. A method for producing pulp chips from a standing tree comprising grasping said tree when it is in an upright position, severing the base of said tree, continuously feeding said cut tree vertically downwards to a chipping zone, continuously chipping said tree as it advances in said chipping zone for forming wood chips, and retrieving the chips produced from said chipping zone.

14. In a method for producing chips as defined in claim 13 including retrieving said chips from said chipping zone comprising creating a draft in said chipping zone, forcing said chips into a dry pumping zone and conveying said chips through a conveying duct.

15. An apparatus for felling and treating trees in order to form wood chips including in combination a motor vehicle and a chipping head articulated at one end of said vehicle, said chipping head comprising an open rectangular frame member, said frame member having its major axis normally in an upstanding position when said chipping head is in operation, said open frame member including top and bottom tree-receiving platform members interspaced by side frame beams, said tree-receiving platform defining tree-receiving U-shaped recesses, hydraulically operated arms pivotally mounted on said tree-receiving platform adapted to pivot between a tree-clamping position and a release position, at least one driven roller mounted at the bight of said tree-receiving recess on said tree-receiving platform and adapted to engage the tree trunk for feeding the tree in a downward direction; a secondary frame pivotally mounted to the bottom ends of said side frame beams, said secondary frame member mounting a rotary chipping means comprising a frusto-conical drum having a hollow drum fixedly mounted to a driven shaft, radially stripped and tangentially extending teeth mounted on said drum, an aperture defined in said drum ahead of each tangentially extending tooth, whereby the chips being formed pass through the interior of the drum, pump means axially aligned at the larger end of said drum with said frusto-conical drum for receiving said chips from said conical drum, and a flexible duct communicating with said pump means for conducting said chip from said pump to a suitable receiver.

16. In an apparatus for producing chips, a chipping head comprising a frusto-conical drum mounted on a shaft for rotation about its longitudinal axis, the drum having a closed smaller diameter end and an open larger diameter end, a plurality of cutting knives on said drum and extending away from the periphery thereof, said knives all extending in the normal direction of rotation of said drum, said knives being uniformly spaced circumferentially in axially, staggered, overlapping relation from one end to the other of said drum and forming a spiral-like relation on the outer surface of said drum to afford an effective cutting action across the width of said drum, said drum including an aperture forwardly and at the base of each knife and communicating with the interior of said drum whereby as the drum and knives are rotated into engagement with a log or the like the knives successively form a chip with minimum resistance to rotation and the chips pass through the apertures, into said drum and are expelled axially thorugh the open end of the drum due to centrifugal force produced by drum-rotation, and vanes depending from the inner surface of said drum adjacent certain of said apertures and having a pitch for creating a draft axially within said drum and toward the open end thereof for urging chips thereout.

References Cited
UNITED STATES PATENTS

| | | | |
|---|---|---|---|
| 3,140,736 | 7/1964 | Propst | 143—46 |
| 2,712,904 | 7/1955 | Durkee | 144—176 |
| 3,198,224 | 8/1965 | Hiley | 144—2 |
| 526,043 | 9/1894 | Merrill | 144—172 |
| 349,332 | 9/1886 | Anderson | 241—293 |
| 3,304,970 | 2/1967 | Altosaar | 144—172 |

DONALD R. SCHRAN, *Primary Examiner.*